US012548951B2

(12) United States Patent
Miedl et al.

(10) Patent No.: US 12,548,951 B2

(45) Date of Patent: Feb. 10, 2026

(54) PREFABRICATED CABLE, CABLE PLUG CONNECTOR ARRANGEMENT, AND ELECTRICAL PLUG CONNECTION

(71) Applicant: Rosenberger Hochfrequenztechnik GmbH & Co. KG, Fridolfing (DE)

(72) Inventors: Thomas Miedl, Garching (DE); Martin Zebhauser, Laufen (DE); Walter Baldauf, Fridolfing (DE); Thomas Schmid, Teisendorf (DE); Michael Angerbauer, Taching (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 308 days.

(21) Appl. No.: 18/561,406

(22) PCT Filed: May 9, 2022

(86) PCT No.: PCT/EP2022/062465

§ 371 (c)(1),
(2) Date: Nov. 16, 2023

(87) PCT Pub. No.: WO2022/243083

PCT Pub. Date: Nov. 24, 2022

(65) Prior Publication Data

US 2024/0235125 A1 Jul. 11, 2024

(30) Foreign Application Priority Data

May 21, 2021 (EP) .................................... 21175273

(51) Int. Cl.

| | |
|---|---|
| ***H01R 13/6581*** | (2011.01) |
| ***H01R 9/05*** | (2006.01) |
| ***H01R 13/6592*** | (2011.01) |

(52) U.S. Cl.

CPC ....... *H01R 13/6581* (2013.01); *H01R 9/0518* (2013.01); *H01R 13/6592* (2013.01)

(58) Field of Classification Search

CPC .............. H01R 13/6581; H01R 13/658; H01R 13/646; H01R 13/6461; H01R 13/65912;

(Continued)

(56) References Cited

U.S. PATENT DOCUMENTS

| | | | | |
|---|---|---|---|---|
| 5,073,128 A * | 12/1991 | Sirai | .................... | H01R 9/0518 439/585 |
| 5,195,906 A * | 3/1993 | Szegda | ................ | H01R 9/0521 439/255 |

(Continued)

FOREIGN PATENT DOCUMENTS

| | | |
|---|---|---|
| DE | 19907675 A1 | 9/2000 |
| DE | 20016527 U1 | 11/2000 |

(Continued)

*Primary Examiner* — Harshad C Patel

(74) *Attorney, Agent, or Firm* — Dickinson Wright PLLC

(57) ABSTRACT

The present invention relates to a prefabricated cable, to a cable plug connector arrangement, and to an electrical plug connection. A prefabricated cable (1) has a shielding foil (4), a shielding braid (5) which surrounds the shielding foil (4), and a cable sheath (6) which surrounds the shielding braid (5). The shielding braid (5) is exposed from the cable sheath (6) at a plug-side end (8) of the prefabricated cable (1). The shielding foil (4) has a dielectric foil (9) made of a dielectric material, and a metal coating (101, 102) on an outer lateral surface and on an inner lateral surface of the dielectric foil (9). The metal coating (101) on the outer lateral surface is electrically conductively connected to the metal coating (102) on the inner lateral surface in a plug-side end region (11) of the shielding foil (4) via at least one electrically conductive connection (12). According to the invention, the at least one electrical connection (12) is passed through the dielectric foil (9) in a plug-side axial end region of the (Continued)

Figure 1A:
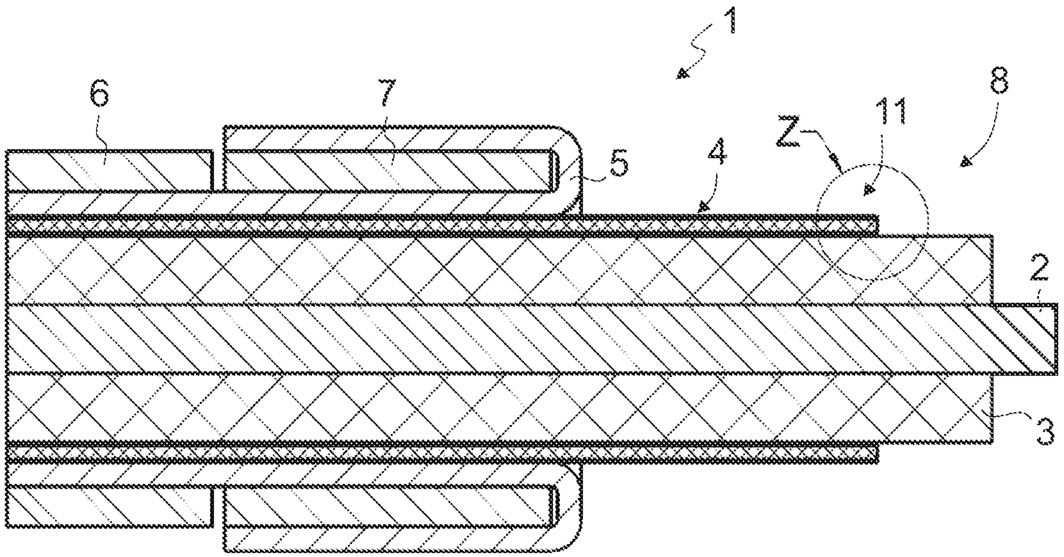

shielding foil (4) and/or at least partially covers an end face of the dielectric foil (9) at a plug-side axial end of the shielding foil (4).

19 Claims, 10 Drawing Sheets

(58) Field of Classification Search
CPC .............. H01R 13/6592; H01R 9/0518; H01R 11/28; H01R 4/20
USPC ...................................................... 439/607.01
See application file for complete search history.

(56) References Cited

U.S. PATENT DOCUMENTS

| | | | | |
|---|---|---|---|---|
| 5,217,392 | A * | 6/1993 | Hosler, Sr. | H01R 9/0503 439/585 |
| 5,432,301 | A * | 7/1995 | Gehring | D04C 1/06 174/88 C |
| 6,107,572 | A * | 8/2000 | Miyazaki | H01R 9/0518 174/75 C |
| 6,835,096 | B2 * | 12/2004 | Togashi | H01R 9/0518 439/578 |
| 6,951,483 | B2 * | 10/2005 | Kameyama | H01R 9/0518 439/99 |
| 7,291,043 | B2 * | 11/2007 | Morikawa | H01R 9/05 439/585 |
| 7,425,161 | B2 * | 9/2008 | Morikawa | H01R 9/053 439/877 |
| 7,695,332 | B2 * | 4/2010 | Morikawa | H01R 9/053 439/585 |
| 9,397,411 | B2 * | 7/2016 | Ito | H01R 9/0518 |
| 2008/0314636 | A1 * | 12/2008 | Ogura | H01B 11/1895 174/350 |

FOREIGN PATENT DOCUMENTS

| | | | |
|---|---|---|---|
| DE | 102015004485 | A1 | 10/2016 |
| EP | 3435482 | A1 | 1/2019 |

* cited by examiner

PREFABRICATED CABLE, CABLE PLUG CONNECTOR ARRANGEMENT, AND ELECTRICAL PLUG CONNECTION

CROSS-REFERENCE TO RELATED APPLICATIONS

The present application is a U.S. National Stage of International Application No. PCT/EP2022/062465, filed on May 9, 2022, which claims the benefit and priority of European Patent Application No. 21 175 273.8, filed on May 21, 2021, the entire contents of which are fully incorporated herein by reference.

FIELD OF THE INVENTION

The present invention relates to a prefabricated cable having the features of patent claim 1. The present invention also relates to a cable plug connector arrangement having the features of patent claim 13. The present invention lastly relates to an electrical plug connection having the features of patent claim 17.

TECHNICAL BACKGROUND

For the transmission of high-frequency signals, use is typically made of a shielded cable, in which at least one inner conductor is enclosed by an outer conductor. In this respect, the electromagnetic wave is guided in an electrically insulating insulator between the inner and the outer conductor. In addition to the guidance of an electromagnetic wave inside the shielded cable, the outer conductor is also used for shielding. The shielding protects the electromagnetic wave guided in the shielded cable from high-frequency interference from the exterior space of the cable and at the same time prevents irradiation of the electromagnetic wave guided in the shielded cable into the exterior space. The shielding, or the outer conductor of the shielded cable, is typically formed by a combination of a shielding foil and a shielding mesh enclosing the shielding foil. The combination of shielding foil and shielding mesh links the good shielding attenuation of the shielding foil at higher frequencies to the good shielding attenuation at low frequencies and better mechanical properties, in particular high breaking strength, of the shielding mesh.

A shielding foil is typically made from a dielectric foil which is coated on its two lateral surfaces, that is to say on its inner wall and on its outer wall, with a metallic coating.

A shielding foil formed in this way can transmit an electromagnetic wave between the two metallic coatings. With respect to the actual transmission path between the inner conductor and the inner-wall metal coating of the shielding foil, there is thus an undesired additional transmission path for the electromagnetic wave. Since in a high-frequency plug connector the electromagnetic wave in the cable junction can be fed both into the actual transmission path and into an undesired additional transmission path, the actual transmission path therefore loses some of the signal energy of the high-frequency signal.

Moreover, the two-conductor system of the shielding foil is connected in series with the two-conductor system of the inner conductor and the inner-wall coating of the shielding foil of the actual cable transmission path. Owing to the impedance of the two-conductor system of the shielding foil, the overall impedance of the cable is distorted and no longer matched to the impedance of the plug connector. This mismatch causes reflections and thus an additional loss of signal energy that is to be transmitted.

Lastly, in the two-conductor transmission system of the doubly metallically coated shielding foil, which is wound helically around the dielectric of the cable, in a certain frequency range and owing to resonant effects there can be an increase in the load impedance in relation to the matched characteristic impedance of the shielding foil and thus undesired reflections and an additional loss of signal energy that is to be transmitted.

When transmitting high-frequency signals, the transmission factor of the actual transmission path thus becomes worse.

This is a state which should be improved.

Regarding the general technical background, reference will also be made to the following documents.

DE 200 16 527 U1 relates to an electric installation line which is intended to be usable additionally for the transmission of telecommunications signals. The installation line comprises a shielding foil which is wound around the cable in such a way as to result in a certain overlap of the outer aluminum layers, in order to provide particularly effective shielding.

DE 10 2015 004 485 A1 and EP 3 435 482 A1 each describe methods for producing a coaxial plug connector arrangement.

SUMMARY OF THE INVENTION

Against this background, the present invention is based on the object of specifying a technical solution in which the signal losses in the actual transmission path of the shielded cable owing to undesired feeding of the high-frequency signal into the shielding foil are reduced.

According to the invention, this object is achieved by a prefabricated cable having the features of patent claim 1.

The following is accordingly provided:

A prefabricated cable comprising a shielding foil, a shielding mesh which encloses the shielding foil, and a cable sheath which encloses the shielding mesh, wherein the cable sheath exposes the shielding mesh at a plug-side end of the prefabricated cable, wherein the shielding foil comprises a dielectric foil of a dielectric material and a respective metallic coating on an outer lateral surface and on an inner lateral surface of the dielectric foil, and the metallic coating on the outer lateral surface is electrically conductively connected to the metallic coating on the inner lateral surface of the shielding foil via at least one electrically conductive connection.

Therefore, an electrically conductive connection is formed between the metallic coating of the outer lateral surface and the metallic coating of the inner lateral surface.

According to the invention, the at least one electrical connection is guided through the dielectric foil in a plug-side axial end region of the shielding foil (for example through the yet to be described vias, sharp-edged elements, but also by virtue of a material displacement of the dielectric material of the foil) and/or at least partially covers or caps an end face or cross-sectional area of the dielectric foil on a plug-side axial end of the shielding foil (for example by virtue of the yet to be described clamping elements, wires, caps, solder, an outer-conductor contact element or another plug connector component or even the shielding mesh).

Preferably, the electrical connection is not an electrical connection as a result of merely overlapping the shielding foil along the circumference of the cable.

Preferably, the electrical connection touches the end face of the dielectric foil at the axial end, or contacts the end face, and its coatings directly.

The metallic coating of the outer lateral surface can also be referred to as first metallic outer coating of the dielectric foil and the metallic coating of the inner lateral surface can also be referred to as second metallic outer coating of the dielectric foil. The dielectric foil thus forms, in cross section, preferably a stack composed of first metallic outer coating, followed by the dielectric material, in turn followed by the second metallic outer coating.

Preferably, the inner lateral surface of the dielectric foil extends on an outer side of the dielectric foil that faces away from the outer lateral surface of the dielectric foil, particularly preferably the two lateral surfaces extend on outer sides of the dielectric foil that extend parallel to one another.

Preferably, the outer lateral surface of the dielectric foil faces away from the cable center or from the longitudinal axis of the prefabricated cable and the inner lateral surface of the dielectric foil faces toward the cable center or the longitudinal axis of the prefabricated cable.

The finding/idea on which the present invention is based consists, in the case of the shielding foil of a cable, in electrically connecting the metallic coatings of a dielectric material via at least one electrically conductive connection. The electrically conductive connection between the metallic coating on the outer lateral surface and on the inner lateral surface is preferably formed in a plug-side end region of the shielding foil.

The two-conductor system of the shielding foil is short-circuited via the electrical connection of the two metallic coatings at the plug-side end region of the shielding foil. This short circuit prevents the formation of a potential difference between the two metallic coatings. A electromagnetic wave can therefore advantageously no longer be fed into the shielding foil from the plug connector in the cable junction. Parasitic guidance of the electromagnetic wave in the shielding foil is prevented. The short-circuited two-conductor system of the shielding foil no longer distorts the overall impedance of the cable transmission system. The overall impedance of the cable transmission system is thus matched and avoids undesired reflections of the electromagnetic wave. It is also the case that the resonant effects that distort the load impedance in a certain frequency range in relation to the matched characteristic impedance can thus be avoided.

The electrical connection between the metallic coatings on the outer lateral surface and the inner lateral surface of the preferably hollow-cylindrically formed shielding foil can preferably be formed at the plug-side end region of the prefabricated cable. In the plug-side end region of the prefabricated cable, during the fabrication process the shielding mesh and thus also the shielding foil located radially on the inside of the shielding mesh are exposed by the cable sheath. Therefore, the shielding foil in the plug-side end region of the prefabricated cable is easily accessible during the fabrication process and can easily be processed in terms of an electrical connection between the two metallic coatings.

However, it is also conceivable to form the electrical connection between the metallic coatings on the outer lateral surface and the inner lateral surface of the shielding foil in each end region of the cable and/or in an axial intermediate region between the two end regions of the cable.

If the at least one electrical connection is spaced apart from the plug-side axial end of the shielding foil, a spacing from the axial end of less than one quarter of the wavelength of an electromagnetic wave that is to be transmitted during operation of the cable or the plug connector arrangement should preferably be provided, in order to avoid the undesired transformation of no-load operation at the axial end, this transformation possibly occurring in the event of a short circuit positioned at a spacing of a multiple of $\lambda/4$.

The individual electrical connection may be a respective electrically conductive connecting element, for example a metallic cap, a metallic pin, a metallic sleeve, a metallic wire, a metallic clip, a metallic platelet, a metallic spring, a connecting element made of an electrically conductive elastomer—that is to say an elastomer with integrated metal particles—, a metallic wire mesh or any other electrically conductive or metallic connecting element with a suitable shaping. In addition, the electrically conductive connection may also be realized by way of multiple connection elements that are electrically conductively connected, that is to say make mutual electrical contact, for example by way of the combination of the outer-conductor contact element and the shielding mesh, as is yet to be shown. Lastly, the electrically conductive connection may also be implemented by way of a metallic layer or coating, a metallic filling, a solder bridge, an electrically conductive paste or the like.

The individual electrical connection may be connected to the metallic coatings of the shielding foil in force-fitting fashion (for example in the event of crimping the shielding foil and the shielding mesh with the outer-conductor contact element). In addition, an integrally bonded connecting operation (soldering, welding or adhesive bonding (in the case of an electrically conductive elastomer)) or possibly a form-fitting connecting operation is also conceivable.

The electrical connection between the metallic coatings of the shielding foil can also be realized by directly electrically contacting the two metallic coatings, in that the dielectric foil of the shielding foil is displaced by suitable processing at a location in the inside or on the edge of the shielding foil. The electrical connection can therefore be guided through the dielectric foil by material displacement in certain regions.

The individual variants of an electrical connection between the metallic coatings on the outer lateral surface and on the inner lateral surface are each explained in more detail below.

Advantageous embodiments and developments are set forth in the further dependent claims and in the description, with reference to the figures of the drawing.

It will be appreciated that the aforementioned features and the features still to be explained below can be used not only in the respectively cited combination but also in other combinations or singly, without departing from the scope of the present invention.

In a preferred embodiment of an electrical connection, the metallic coatings arranged concentrically in relation to one another are electrically connected to one another over the entire cross section. The region between the two metallic coatings of the shielding foil is thus completely filled with metal. In this case, no electromagnetic wave at all can be incoupled into the shielding foil.

In the simplest case, to this end the end face of the shielding foil, in particular the end face of the dielectric foil of the shielding foil, is completely metallically closed for example by means of a metallic layer or a metallic cap. However, it is also conceivable to electrically connect the two metallic layers of the shielding foil to one another via two sharp-edged, semi-cylindrical metal sheets at a certain axial distance from the end face of the shielding foil.

Owing to the metallic coatings of the shielding foil that are arranged concentrically in relation to one another, in a further embodiment of the invention multiple electrical connections are formed, which preferably are arranged at the same axial position or are arranged distributed over the circumference of the shielding foil in a tightly delimited axial position range of the shielding foil.

In particular, it is advantageous to strive for an even distribution of the individual electrical connections in equidistant angular segments along the circumference of the prefabricated cable. Particularly preferably, it may be intended that the at least one electrical connection covers the entire end face of the dielectric foil at the plug-side axial end of the shielding foil.

In relation to an individual electrical connection, that is to say a discrete electrical connection, between the two metallic coatings of the shielding foil, in such an embodiment the cutoff frequency of the parasitic transmission channel in the shielding foil is increased. In this way, it can be shifted into a frequency range outside the transmission frequency range of the cable.

The electrical connections make it possible to introduce multiple short-circuiting links which subdivide the shielding foil into multiple individual waveguide structures, as it were. By decreasing the distances between the electrical connections, it is therefore possible to influence the cutoff frequency, so that incoupling into the relevant frequency ranges can no longer take place.

Each individual electrical connection between the metallic coatings of the shielding foil can be arranged inside a leadthrough of the shielding foil, each leadthrough being formed between the metallic coatings of the shielding foil. As an alternative, each individual electrical connection between the metallic coatings of the shielding foil may also be arranged in a recess at the edge of the shielding foil, for example in a notch which is made in the edge of the shielding foil continuously between the metallic coatings of the shielding foil. Each individual electrical connection between the metallic coatings of the shielding foil can also be arranged directly adjoining the shielding foil, that is to say directly adjoining the edge of the shielding foil, for example directly adjoining the end side of the shielding foil. Lastly, each individual electrical connection between the metallic coatings of the shielding foil may also be arranged spaced apart from the shielding foil, for example via a metallic wire which electrically connects the two metallic coatings at a certain distance from the shielding foil.

In a particular embodiment of an electrical connection between the metallic coatings of the shielding foil, a punctiform or areal region of the shielding foil is processed in such a way that in the punctiform or areal region the dielectric foil is displaced and the metallic coatings of the shielding foil each make contact with one another. The direct electrical contact between the two coatings of the shielding foil thus forms the electrical connection.

To this end, the respective punctiform or areal region of the shielding foil is processed mechanically (for example by means of an embossing punch), thermally (for example by means of a laser beam) or acoustically (for example by means of an ultrasonic probe) during the fabrication operation. The shielding foil to this end should be processed in the individual punctiform or areal regions in such a way that the electrical contact-connection between the two metallic coatings leads to a latent, that is to say a permanent, electrical connection between the metallic coatings of the shielding foil.

In a preferred embodiment of a prefabricated cable, the exposed shielding mesh is enclosed by a supporting sleeve, or a supporting sleeve is fastened to a portion of the shielding mesh in a known way. The supporting sleeve is fastened to the exposed shielding mesh preferably by means of a crimped connection. The end face of the exposed shielding mesh and thus also the end face of the exposed shielding foil are pushed back around the supporting sleeve. The supporting sleeve is preferably made of metal, in order to form a stable stop during the pressing or crimping of the outer-conductor contact element by means of the pushed-back shielding mesh or the pushed-back shielding foil. Preferably, at least one region of the pushed-back shielding mesh is exposed by the pushed-back shielding foil. The electrical connection between the two metallic coatings of the shielding foil by virtue of an areal electrical contact-connection of at least one surface region of the exposed shielding mesh to a surface region of the shielding foil via the outer-conductor contact element or a further metallic element of the plug connector will be explained in more detail below.

In order to make it possible to push back the shielding foil around the supporting sleeve and the shielding mesh located in between, an incision is made in the shielding foil in the pushed-back region starting from the end side of the shielding foil. The shielding foil has, in the pushed-back region, at least one cutout, preferably a slot-like cutout, which extends in the longitudinal axial direction of the prefabricated cable. In order additionally to make the pushing-back operation easier, preferably multiple cutouts or slot-like cutouts are formed. A respective strip of the shielding foil is formed between each two mutually adjacently formed cutouts.

It is possible for the shielding foil and the shielding mesh respectively not to be pushed back around the supporting sleeve in a special application. In this case, too, the shielding foil can have, starting from the end side, at least one cutout extending in the longitudinal axial direction of the prefabricated cable and, if multiple cutouts are present, a respective strip between two mutually adjacently formed cutouts.

In both cases—pushed-back shielding foil and pushed-back shielding mesh and also non-pushed-back shielding foil and non-pushed-back shielding mesh—it is possible, when the outer-conductor contact element is being pressed or crimped with the shielding mesh and the shielding foil, for individual stranded wires of the shielding mesh to protrude through the cutouts and in the process electrically connect the two metallic coatings of the shielding foil to one another. Instead of the outer-conductor contact element, it is also possible to use a further metallic element inside the plug connector that is pressed against the shielding mesh or against the shielding foil.

In a further embodiment of a prefabricated cable, the strips of the shielding foil that are each formed between two mutually adjacently formed cutouts of the shielding foil are respectively folded in such a way that a longitudinal extent of the folded region is oriented at an angle to a longitudinal extent of the non-folded region of the same strip. Here and in the following text, folding a strip of the shielding foil is understood to mean turning the strip over by 180°. Therefore, the entire non-folded region and at least one subregion of the folded region of the same strip can make electrical contact with the shielding mesh.

By folding the strip, the two metallic coatings of the shielding foil can each face in the same direction. The shielding mesh or a metallic element, for example the outer-conductor contact element of the plug connector, which each at the same time cover and thus electrically contact the non-folded region and a subregion of the folded region of a strip of the shielding foil, can therefore each a respective electrical connection between the two metallic coatings of the shielding foil.

The angle between the longitudinal extent of the folded region and the longitudinal extent of the non-folded region of the same strip is greater than 0° and less than or equal to 90°, preferably greater than 30° and less than 60°, in particular preferably greater than 40° and less than 50° and in the best case 45°.

A cable plug connector arrangement is also covered by the invention. The technical measures already explained above in relation to the prefabricated cable for preventing an electromagnetic wave from being fed into the shielding foil can be transferred equivalently to the cable plug connector arrangement.

The cable plug connector arrangement comprises a prefabricated cable, as already explained, and a plug connector. The plug connector is electrically and mechanically connected to the prefabricated cable at the plug-side end of the prefabricated cable. The plug connector contains at least one outer-conductor contact element, which is electrically connected at least to the shielding mesh and/or to the shielding foil. In this way, the plug connector is connected to the cable on the outer-conductor side and a shielded junction between the plug connector and the cable is realized.

The attachment between the outer-conductor contact element of the plug connector and the shielding of the cable can be done in various ways, with some advantageous options being described by way of example below:

- if a supporting sleeve is used, it is possible to push back solely the shielding mesh around the supporting sleeve, while the shielding foil is not pushed back around the supporting sleeve: in this case, an electrical connection, for example a crimped connection, can be realized solely between the outer-conductor contact element and the shielding mesh; as an alternative, a crimped connection can be implemented between the outer-conductor contact element and the shielding mesh in the region of the supporting sleeve and an electrical connection between the outer-conductor contact element and the shielding foil can be implemented at the plug-side end of the prefabricated cable,
- if both the shielding mesh and the shielding foil are pushed back around the supporting sleeve, there is at least one electrical connection, preferably a crimped connection, between the outer-conductor contact element and the shielding foil; if cutouts, leadthroughs, recesses and the like are formed on the shielding foil, or the shielding mesh has a longer form than the shielding foil, it is additionally possible to implement an electrical connection, preferably a crimped connection, between the outer-conductor contact element and the shielding mesh, and
- for the case in which no supporting sleeve is used, it is primarily possible to provide an electrical connection between the outer-conductor contact element and the shielding mesh; if the shielding foil has a longer form than the shielding mesh, it is additionally also possible for an electrical connection to be present between the outer-conductor contact element and the shielding foil.

The installation of the prefabricated cable in the plug connector enables further options for implementing an electrical connection between the metallic coatings of the shielding foil.

While the variants described above of an electrical connection between the metallic coatings of the shielding foil taking place primarily in a radial direction in relation to the longitudinal axis of the prefabricated cable or of the cable plug connector arrangement, the variants described below of the electrical connection are configured primarily in an axial direction and/or in a rotational circumferential direction.

The shielding mesh is connected to the shielding foil over its surface area, that is to say the outer lateral surface of the shielding foil is connected to the inner lateral surface of the shielding mesh over its surface area.

In the case of the shielding mesh and the shielding foil being pushed back around the supporting sleeve, if the shielding mesh is preferably elongated in relation to the shielding foil, a metallic element inside the plug connector, preferably the outer-conductor contact element, can contact both the shielding foil and the shielding mesh, which is elongated in relation to the shielding foil. The simultaneous contact-connection of shielding mesh and shielding foil by the metallic element, preferably by the outer-conductor contact element, is enabled by a small thickness and a certain deformability of the shielding foil in the pressing operation, in particular in the crimping process. By virtue of the common contact-connection of the shielding mesh and the shielding foil by the metallic element, preferably by the outer-conductor contact element, an electrical connection between the metallic coatings of the shielding foil is realized via the shielding mesh and the metallic element or the outer-conductor contact element.

In the case of the shielding mesh and the shielding foil not being pushed back around a supporting sleeve, if the shielding foil is preferably elongated in relation to the shielding mesh, a metallic element inside the plug connector, preferably the outer-conductor contact element, can likewise simultaneously contact both the shielding mesh and the shielding foil, which is elongated in relation to the shielding mesh. Here, too, an electrical connection between the metallic coatings of the shielding foil is implemented via the shielding mesh and the metallic element or the outer-conductor contact element.

An electrical connection between the metallic coatings of the shielding foil can also be effected via a metallic element or the outer-conductor contact element, if it at the same time contacts the shielding foil and, through at least one recess, leadthrough or cutout respectively formed in the shielding foil, the shielding mesh located therebeneath.

A further variant, by means of which an electrical connection between the metallic coatings of the shielding foil can be brought about, constitutes the formation of a sharp-edged and/or pointed surface structure of the metallic supporting sleeve, the outer-conductor contact element or a further metallic element inside the plug connector. During the crimping process, the sharp-edged and/or pointed surface structure penetrates the shielding foil and in so doing can electrically connect the metallic coatings of the shielding foil to one another.

In a further embodiment of the invention, a supporting sleeve or an outer-conductor contact element or a further metallic element inside the plug connector having a respective embossed surface is also conceivable. In the fabricated state, that is to say in the latent state, of the cable plug connector arrangement, the embossed surface of the supporting sleeve, the outer-conductor contact element or the further metallic element embosses the shielding foil such that the dielectric material of the shielding foil is displaced and the metallic coatings of the shielding foil make electrical contact with one another. Therefore, an equivalent result is obtained on the shielding foil of the fully fabricated cable plug connector arrangement as in the case of the aforementioned preprocessing on the prefabricated cable.

Lastly, an electrical connection between the metallic coatings of the shielding foil can be realized in that the end face of the shielding foil, which is typically hollow-cylindrically shaped, ends in a cavity inside the plug connector that is delimited by metal and thus closed. The metallic delimitation of the cavity can in this respect be for example a metallic encapsulation or a metallic wall. The electrical connection between the metallic coatings of the shielding foil is realized via the metallic delimitation of the cavity in this case.

In this connection, it should be mentioned that the end face of the shielding foil does not necessarily have to end inside the plug connector, but can also be guided out of the plug connector. The technical measures explained above in the case of the prefabricated cable for preventing an electromagnetic wave from being fed into the dielectric foil of the shielding foil can be applied equivalently to an outwardly guided shielding foil. In this case, the penetration of high-frequency interference radiation, that is to say external EMC, into the shielding foil from the outside is avoided.

Lastly, an electrical plug connection is also covered by the invention. The technical measures already explained above in relation to the prefabricated cable and the cable plug connector arrangement for preventing an electromagnetic wave from being fed into the shielding foil can be transferred equivalently to the electrical plug connection.

The electrical plug connection comprises the already explained cable plug connector arrangement with a plug connector and a mating plug connector corresponding to the plug connector. In order to realize the electrical plug connection, at least the plug connector and the mating plug connector are each electrically connected to one another on the inner-conductor and outer-conductor side.

Lastly, a shielding foil for an electrical cable is also covered by the invention. The shielding foil comprises a dielectric foil made of a dielectric material, the dielectric foil being coated with metal on its lateral surfaces, in particular comprises a metallic coating on a first lateral surface (for example the lateral surface referred to above as "outer lateral surface") and a second lateral surface (for example the lateral surface referred to above as "inner lateral surface"). An electrically conductive connection is set up between the electrical coating, or between the two metal-coated lateral surfaces.

The shielding foil may for example be produced in such a way that the electrically conductive connection between the two lateral surfaces already exists, for example by making leadthroughs in the dielectric material or by manufacturing the dielectric material already with corresponding leadthroughs, through which the metal to be applied in the context of the coating extends and thus establishes the electrically conductive connection between the lateral surfaces in the manner of vias.

It may moreover also be intended for the dielectric foil at the edges or side surfaces to likewise be coated with metal or be processed in another way, as a result of which the electrically conductive connection between the two lateral surfaces can be established via the edges or side surfaces of the dielectric foil.

The technical measures already explained above in relation to the prefabricated cable, the cable plug connector arrangement and the plug connection for preventing an electromagnetic wave from being fed into the shielding foil can be transferred equivalently to the shielding foil.

The above embodiments and developments can be combined with one another in any desired manner, insofar as is feasible. Further possible embodiments, developments and implementations of the invention also encompass combinations, not explicitly mentioned, of features of the invention that are described above or below with regard to the exemplary embodiments. In particular, a person skilled in the art will also add individual aspects as improvements or supplementations to the respective basic form of the present invention.

CONTENTS OF THE DRAWING

Figure 1B:
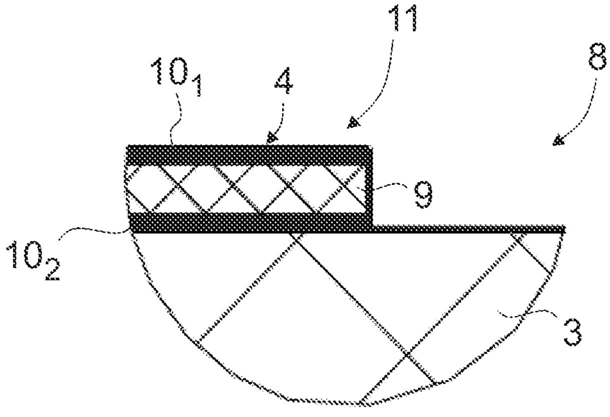
Figure 2A:
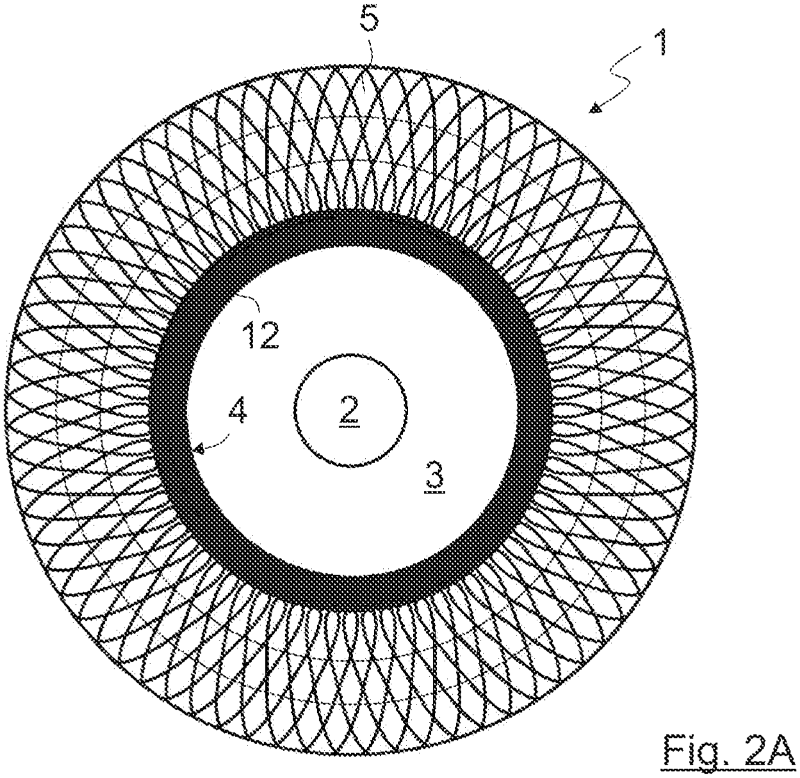
Figure 2B:
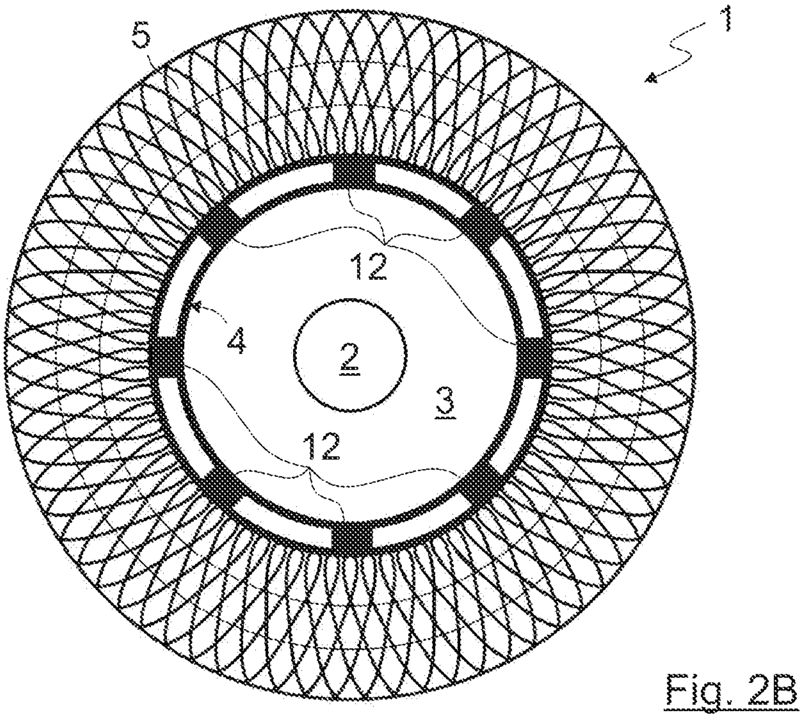
Figure 3A:
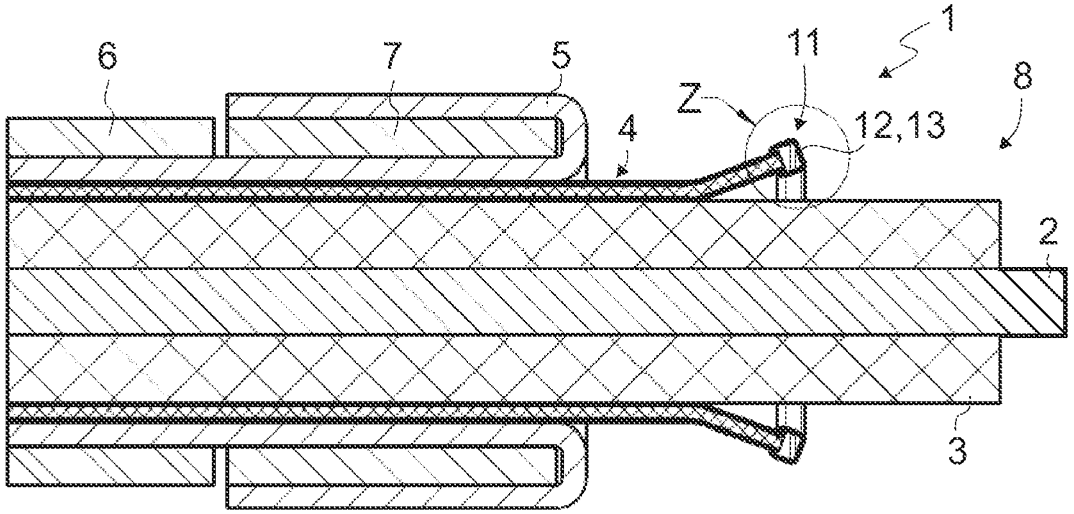
Figure 3B:
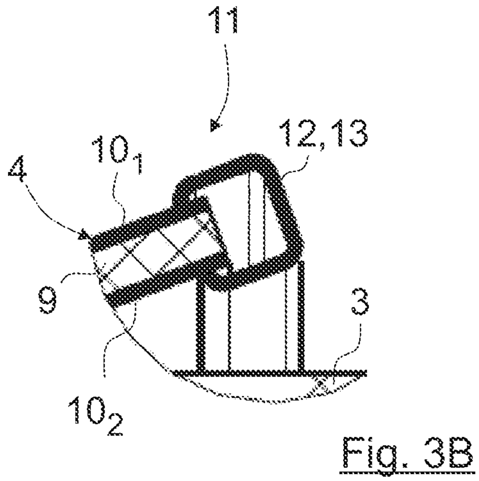
Figure 4A:
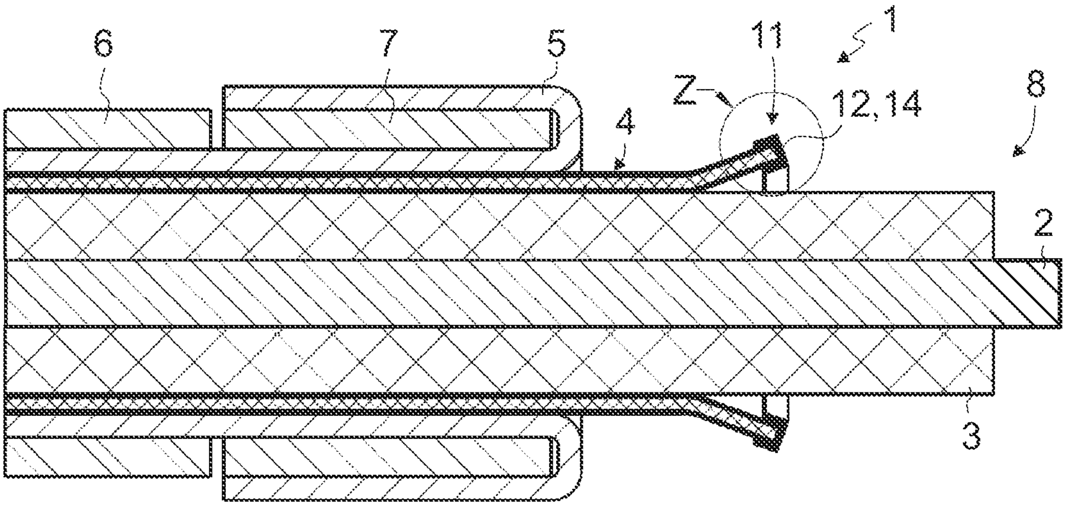
Figure 4B:
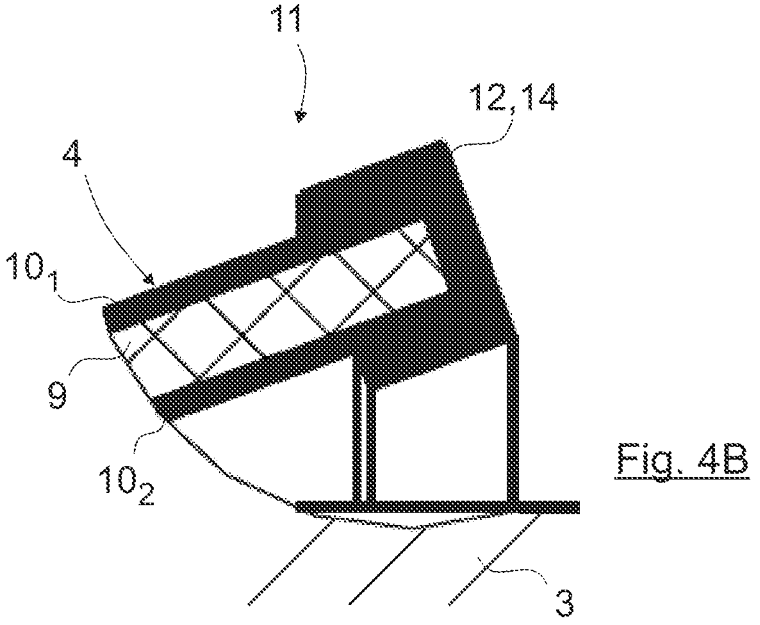
Figure 5A:
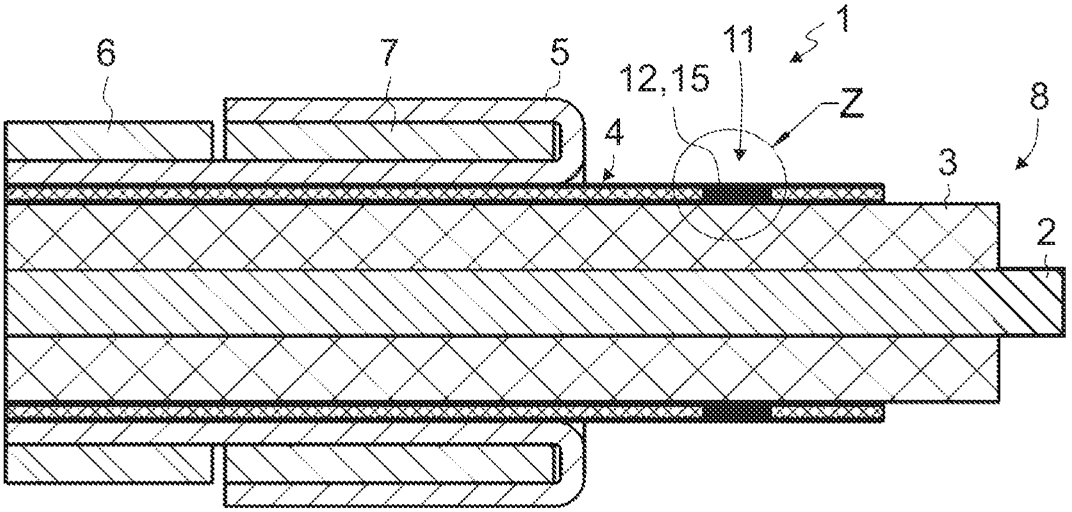
Figure 5B:
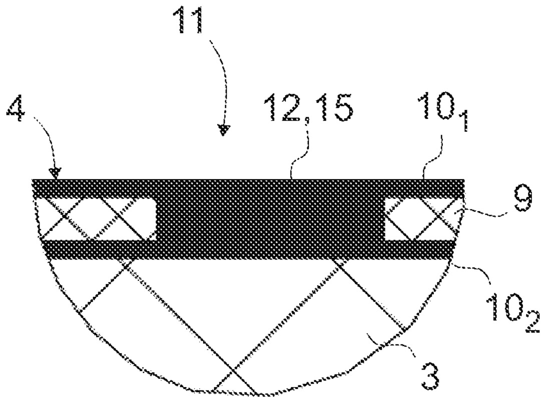
Figure 6A:
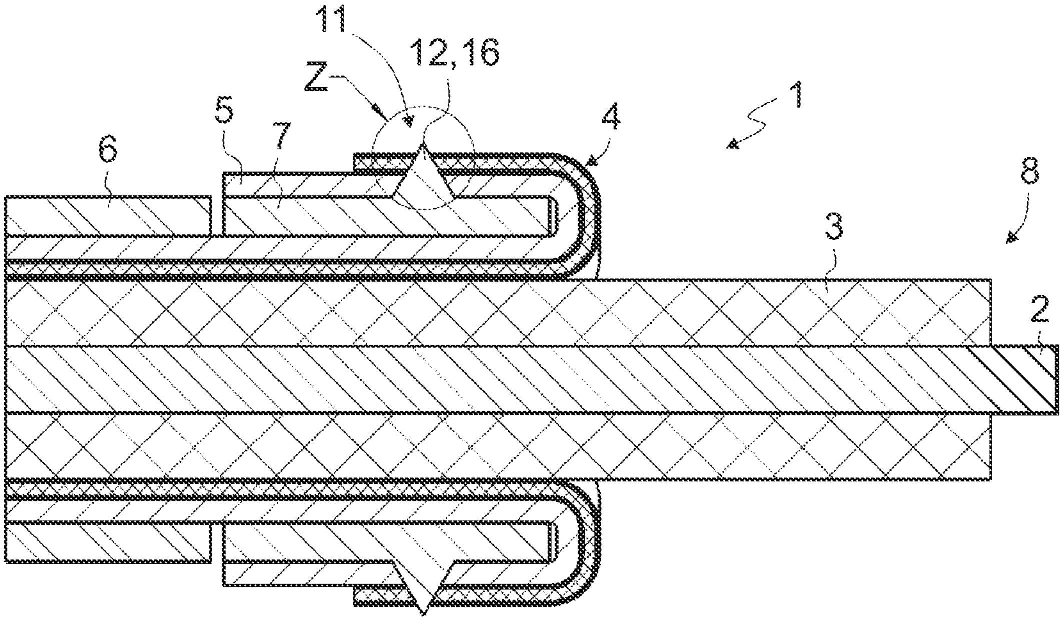
Figure 6B:
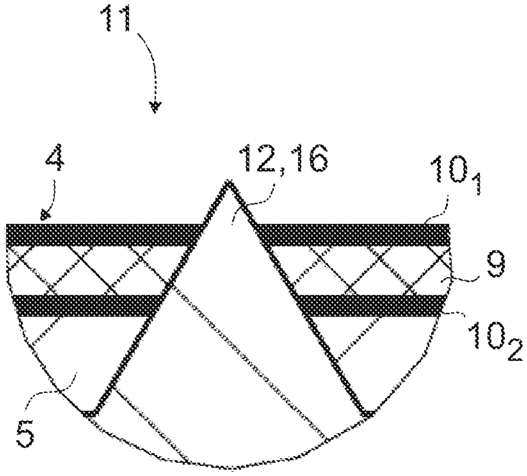
Figure 7:
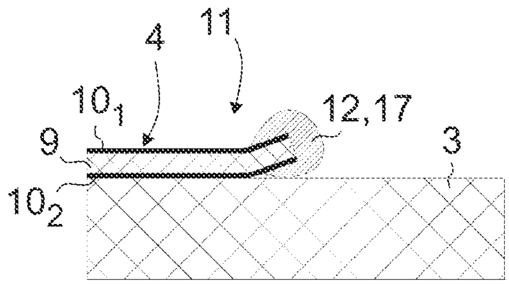
Figure 8:
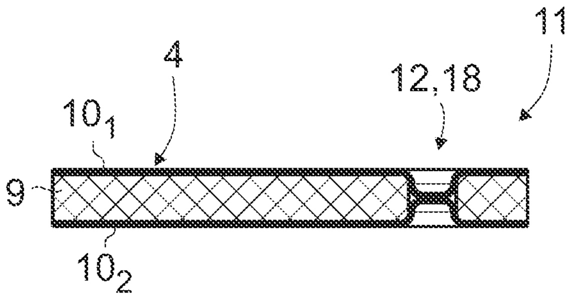
Figure 9A:
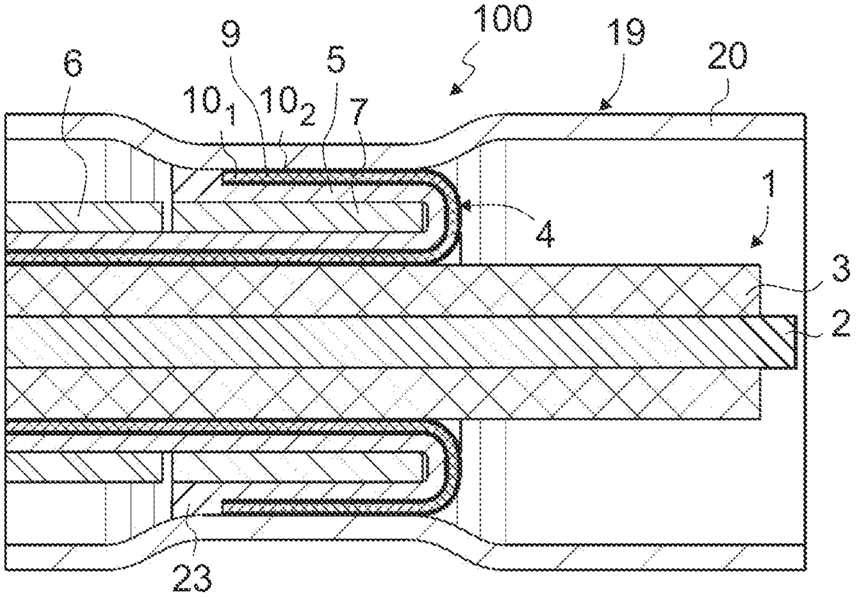
Figure 9B:
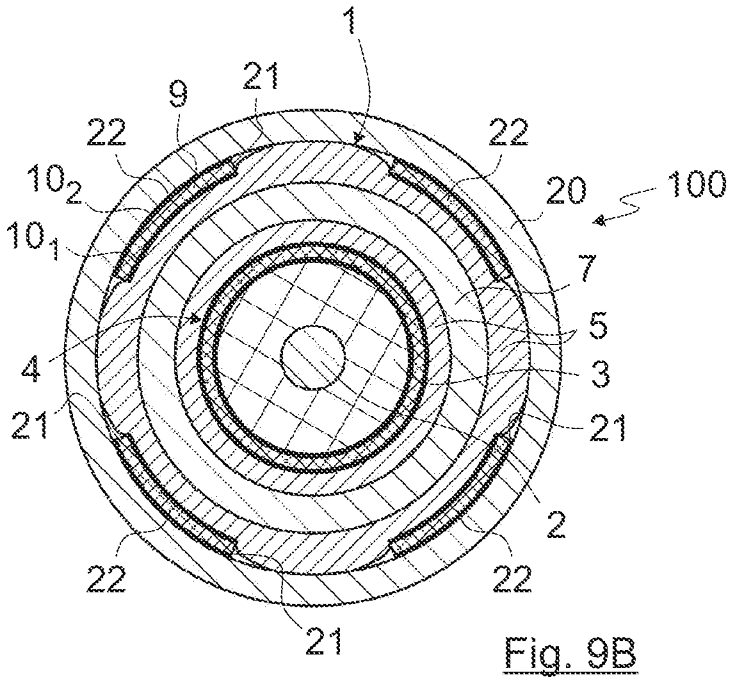
Figure 9C:
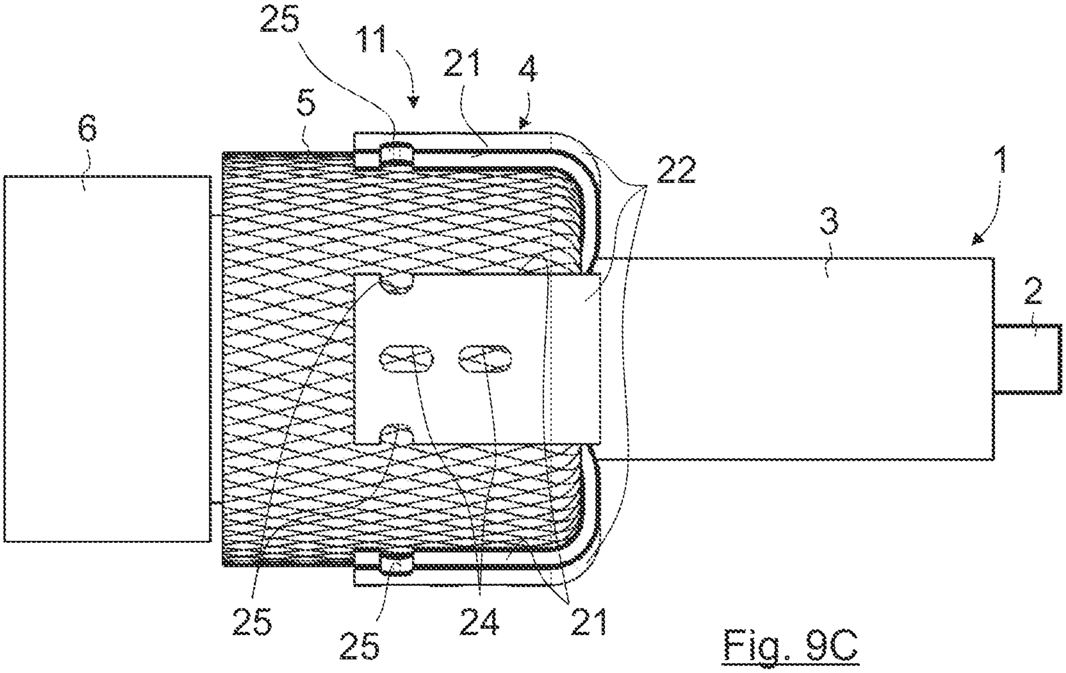
Figure 10A:
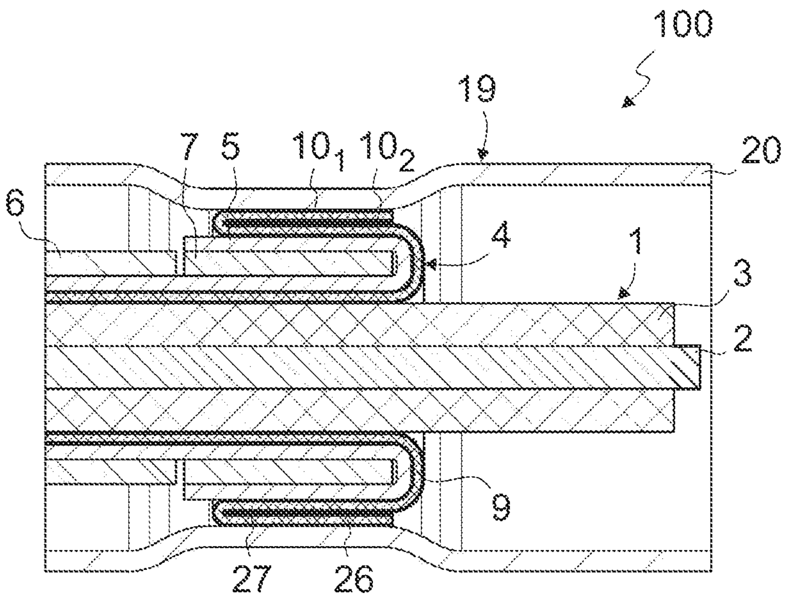
Figure 10B:
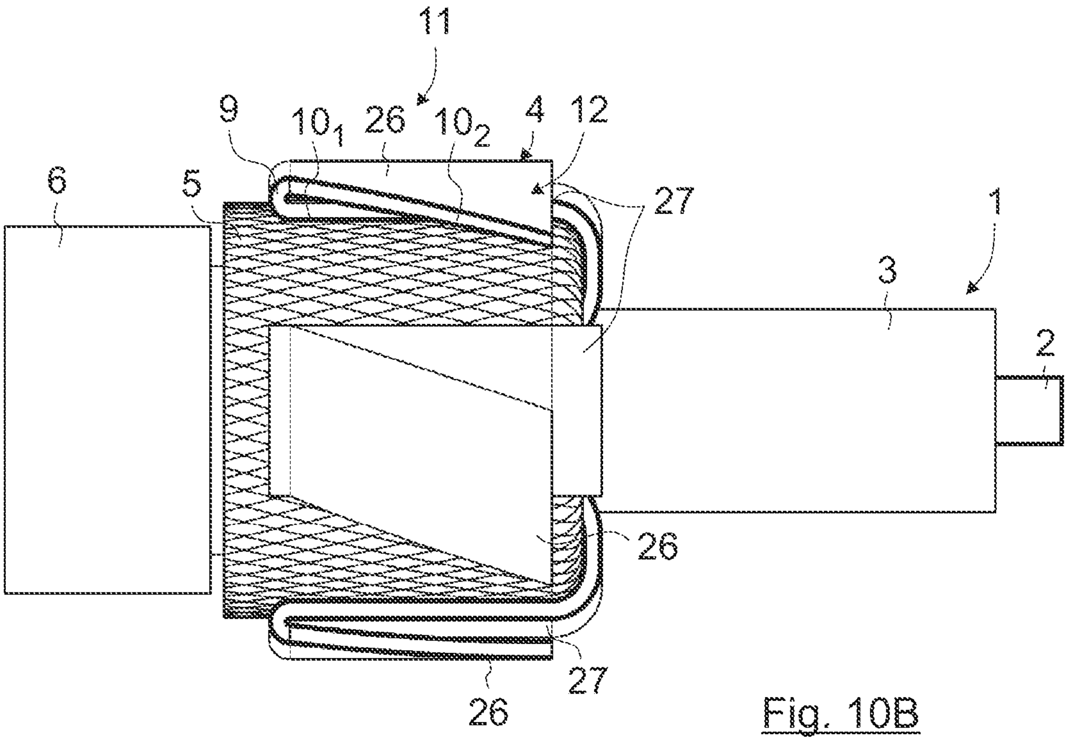
Figure 11:
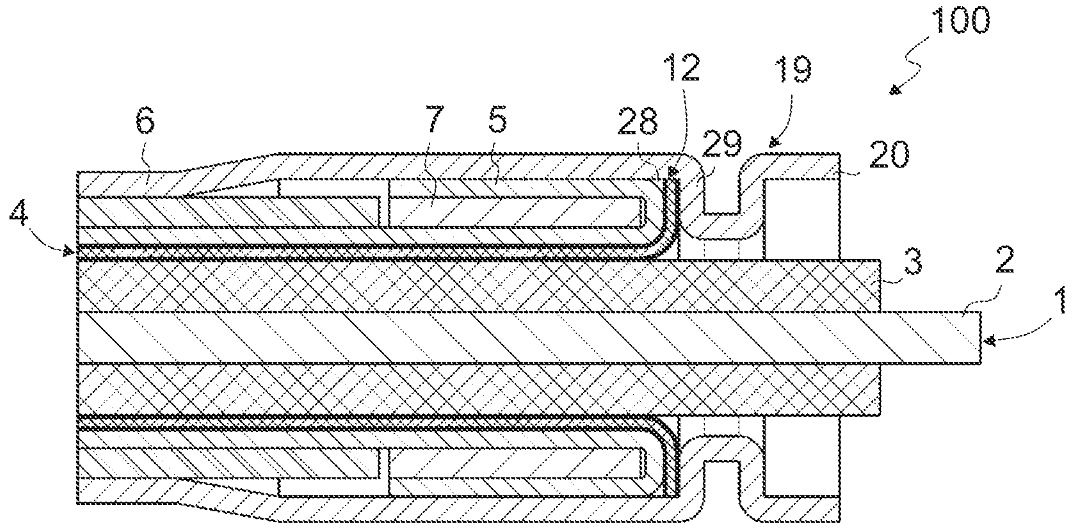
Figure 12:
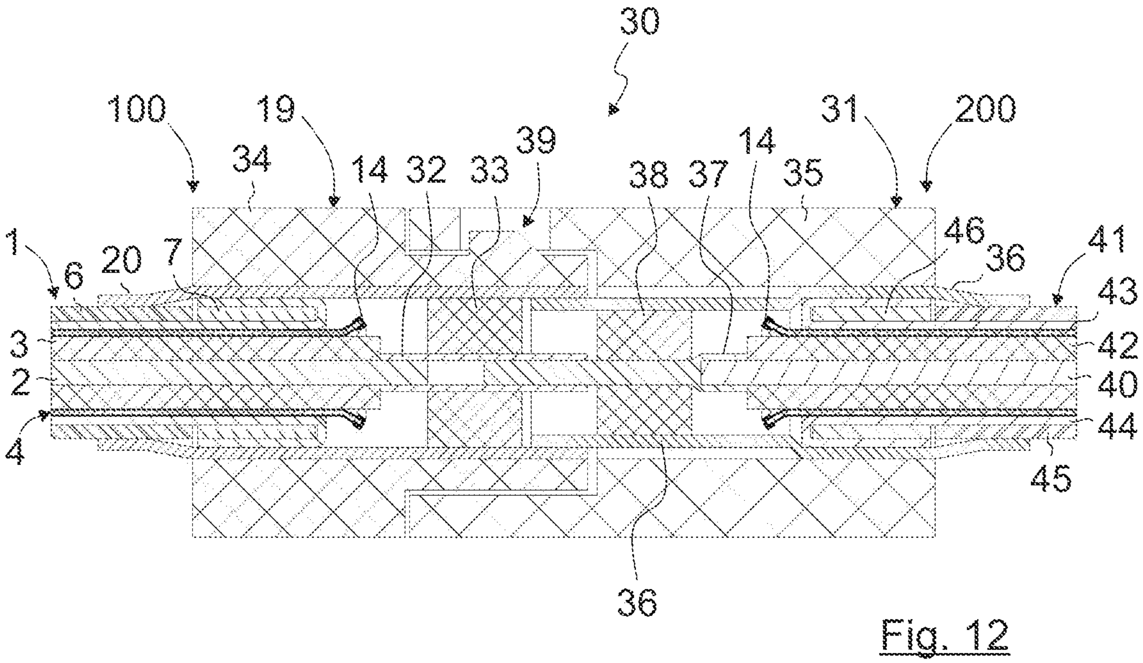

The present invention is explained in more detail below with reference to the exemplary embodiments shown in the schematic figures of the drawing. In the drawing:

FIG. 1A,1B show a longitudinal sectional illustration through a prefabricated cable and a detail thereof according to the prior art, FIG. 2A,2B show a side view of a first and a second exemplary embodiment of a prefabricated cable, FIG. 3A,3B show a longitudinal sectional illustration through a third exemplary embodiment of a prefabricated cable and a detail thereof, FIG. 4A,4B show a longitudinal sectional illustration through a fourth exemplary embodiment of a prefabricated cable and a detail thereof, FIG. 5A,5B show a longitudinal sectional illustration through a fifth exemplary embodiment of a prefabricated cable and a detail thereof, FIG. 6A,6B show a longitudinal sectional illustration through a sixth exemplary embodiment of a prefabricated cable and a detail thereof, FIG. 7 shows a longitudinal sectional illustration through a detail of a seventh exemplary embodiment of a prefabricated cable, FIG. 8 shows a longitudinal sectional illustration through a detail of an eighth exemplary embodiment of a prefabricated cable, FIG. 9A,9B show a longitudinal sectional illustration and a cross-sectional illustration through a plug connector according to the invention, FIG. 9C shows a side view of a further embodiment of a prefabricated cable for a plug connector according to the invention, FIG. 10A, 10B show a longitudinal sectional illustration and a side view of a further embodiment of a plug connector according to the invention, FIG. 11 shows a longitudinal sectional illustration through a further embodiment of a plug connector according to the invention, and FIG. 12 shows a cross-sectional illustration through an electrical plug connection according to the invention.

The accompanying figures of the drawing are intended to convey a better understanding of the embodiments of the invention. They illustrate embodiments and, in connection with the description, serve to explain the principles and concepts of the invention. Other embodiments and many of the advantages mentioned will become clear from the drawings. The elements in the drawings are not necessarily shown in a manner true to scale in relation to one another.

In the figures of the drawing, identical, functionally identical and identically acting elements, features and components are each provided with the same reference signs, unless stated otherwise.

The figures are described in an interrelated and comprehensive manner below.

DESCRIPTION OF EXEMPLARY EMBODIMENTS

Although the present invention has been fully described above on the basis of preferred exemplary embodiments, it is not restricted to these and instead can be modified in a variety of ways.

FIG. 1A shows a prefabricated cable 1 according to the prior art. This prefabricated cable 1 comprises at least one inner conductor 2, an insulating element 3 enclosing the inner conductor 2, a shielding foil 4 enclosing the insulating element 3, a shielding mesh 5 enclosing the shielding foil 4, a cable sheath 6 enclosing the shielding mesh 5, and a supporting sleeve 7.

The shielding foil 4 and the shielding mesh 5 form the outer conductor of the prefabricated cable 1. As is routine, the at least one inner conductor 2 is exposed by the insulating element 3 in each case at a plug-side end 8 of the prefabricated cable 1. Similarly, at the plug-side end 8 of the prefabricated cable 1, the insulating element 3 is exposed by the shielding foil 4 and the shielding mesh 5, and the shielding mesh 5 is exposed by the cable sheath 6. The supporting sleeve 7 is connected to the shielding mesh 5 preferably by means of a crimped connection at the shielding foil 4 exposed by the cable sheath 6. The plug-side end of the shielding mesh 5 is pushed back around the supporting sleeve 7.

As can be seen in FIG. 1B, the hollow-cylindrical shielding foil 4 comprises a dielectric foil 9 and a respective metallic coating $\mathbf{10}_1$ and $\mathbf{10}_2$ on the outer lateral surface and on the inner lateral surface. As can be seen clearly in FIGS. 1A and 1*n* particular in the enlarged detail Z in FIG. 1B, the end face in the plug-side end region 11 of the shielding foil 4 is not coated with metal.

An electromagnetic wave incoupled into the prefabricated cable 1 in an electrical plug connector consequently enters not only the usual waveguide, which is formed in the insulating element 3 between the inner conductor 2 and the metallic coating $\mathbf{10}_2$ on the inner lateral surface of the shielding foil 4, but also a waveguide which is connected in series therewith and is formed in the dielectric foil 9 of the shielding foil 4 between the metallic coatings $\mathbf{10}_1$ and $\mathbf{10}_2$ on the outer lateral surface and on the inner lateral surface. As a result, signal energy from the electromagnetic wave that is to be transmitted is withdrawn from the actual waveguide of the shielded cable 1. The transmission factor of the shielded cable disadvantageously becomes worse.

In order to minimize, or preferably prevent, an electromagnetic wave from incoupling into the shielding foil 4 of the prefabricated cable 1, according to the invention the metallic coatings $\mathbf{10}_1$ and $\mathbf{10}_2$ on the outer and the inner lateral surface of the shielding foil 4 are electrically connected to one another, preferably in the plug-side end region 11 of the shielding foil 4.

In a first exemplary embodiment of a prefabricated cable 1 according to the invention, the electrical connection between the metallic coatings $\mathbf{10}_1$ and $\mathbf{10}_2$ on the outer and on the inner lateral surface of the shielding foil 4 is effected by virtue of a metallization of the end face of the shielding foil 4 according to FIG. 2A. In such an embodiment of a prefabricated cable 1, an electromagnetic wave is prevented from incoupling into the shielding foil 4 to the best extent possible. The electromagnetic wave cannot penetrate the shielding foil 4 at all. The end face of the shielding foil 4 can in this case be completely coated with metal or completely covered with a metallic body during the fabrication process.

In a second exemplary embodiment of a prefabricated cable 1 according to the invention, multiple discrete electrically conductive connections 12 are formed between the metallic coatings $\mathbf{10}_1$ and $\mathbf{10}_2$ on the outer and on the inner lateral surface of the shielding foil 4. These individual electrically conductive connections 12 are preferably realized in equidistant angular segments of the cross section of the shielding foil 4. In relation to an embodiment variant of the prefabricated cable 1 according to the invention in which only one individual electrically conductive connection 12 is formed between the metallic coatings $\mathbf{10}_1$ and $\mathbf{10}_2$ of the shielding foil 4, the capacitance per unit area in the case of multiple electrically conductive connections 12 on end faces of the shielding foil 4 and thus the incoupling of an electromagnetic wave into the shielding foil 4 are reduced. The formation of electrically conductive connections 12 between the metallic coatings $\mathbf{10}_1$ and $\mathbf{10}_2$ of the shielding foil 4 can be limited to the plug-side end region 11 of the shielding foil 4. The individual electrically conductive connections 12 may each be realized via an individual metallic coating, via an individual metallic covering or via an electrical connecting element that is still to be explained below.

In a third exemplary embodiment (cf. FIG. 3A, 3B), each electrically conductive connection 12 may be realized via a metallic connecting element 13 spaced apart from the end face of the shielding foil 4. It can be, for example, an individual metallic wire, an individual metallic clamping element or an individual metallic retaining clip. If the metallic connecting element 13 that is spaced apart from the end face of the shielding foil 4 extends over the entire end face of the shielding foil 4, a slotted metallic hollow ring can be used for this, for example, according to FIGS. 3A and 3B. Each of the metallic connecting elements 13 spaced apart from the shielding foil 4 contacts the metallic coatings $\mathbf{10}_1$ and $\mathbf{10}_2$ of the shielding foil 4 preferably in integrally bonded or force-fitting fashion.

In a fourth exemplary embodiment (cf. FIG. 4A, 4B), each electrically conductive connection 12 may be formed via a metallic connecting element 14 bearing against the end face of the shielding foil 4. It can be, for example, an individual metallic clamping element or an individual metallic retaining clip. In the case of a metal connecting element 14 that bears against the end face of the shielding foil 4 and extends over the entire end face of the shielding foil 4, it may for example be a metallic annular cap with a U-shaped cross-sectional profile, according to FIGS. 4A and 4B. The connection between the at least one metallic connecting element 14 and the metallic coatings $\mathbf{10}_1$ and $\mathbf{10}_2$ of the shielding foil 4 is also preferably made in integrally bonded or force-fitting fashion.

In a fifth embodiment, each electrically conductive connection 12 according to FIGS. 5A and 5B can be implemented by way of a metallic via 15 of the shielding foil 4 in the end region 11 of the shielding foil 4. The metallic via 15 may for example be implemented mechanically by means of clamping a suitably shaped metal element into the shielding foil 4 or by means of metallically coating a leadthrough mechanically or possibly thermally formed beforehand in the shielding foil 4 or the dielectric foil 9. The metallic vias 15 are preferably evenly distributed over the circumference of the shielding foil 4. The via 15 may be realized, according to FIGS. 5A and 5B, as a leadthrough between the two metallic coatings $10_1$ and $10_2$ inside the shielding foil 4 but also as a recess or a notch between the two metallic coatings $10_1$ and $10_2$ on the edge of the shielding foil 4.

In a sixth embodiment (cf. FIG. 6A, 6B), the electrically conductive connection 12 may be realized via a pointed and/or sharp-edged surface structure 16 of the supporting sleeve 7, the surface structure completely penetrating the shielding foil 4 and electrically connecting the metallic coatings $10_1$ and $10_2$ of the shielding foil 4 to one another in particular when the prefabricated cable 1 is being pressed or crimped with the outer-conductor contact element of the plug connector. The point 16 schematically illustrated in each of FIGS. 6A and 6B, which is formed on the outer surface of the supporting sleeve 7, in this case completely penetrates the pushed-back shielding mesh 5 and the likewise pushed-back shielding foil 4.

Owing to the sharp-edged nature and the steepness of the point 16, an electrical contact-connection between the metallic coatings $10_1$ und $10_2$ of the shielding foil 4 is secured via the pointed and/or sharp-edged surface structure 16 of the supporting sleeve 7 made of metal. As an alternative to the metallic supporting sleeve 7, it is also possible to use another metallic element inside the plug connector, for example the outer-conductor contact element, that has a pointed and/or sharp-edged surface structure 16 and is pressed against the pushed-back or non-pushed-back shielding foil 4, in the process electrically connecting the metal coatings $10_1$ and $10_2$ of the shielding foil 4 to one another.

In a seventh exemplary embodiment, the electrically conductive connection 12 between the metallic coatings $10_1$ and $10_2$ of the shielding foil 4 according to FIG. 7 is formed via a soldered connection 17 or an electrically conductive paste 17 which bears against the end face of the shielding foil 4.

In an eighth exemplary embodiment (cf. FIG. 8), the electrically conductive connection 12 between the metallic coatings $10_1$ and $10_2$ of the shielding foil 4 is formed by means of a mutual electrical contact-connection 18 between the metallic coatings $10_1$ and $10_2$. To this end, the shielding foil 4 is processed at least at one location in its plug-side end region 11 in such a way that the dielectric foil 9 located between the two metallic coatings $10_1$ and $10_2$ of the shielding foil 4 is displaced and the two metallic coatings $10_1$ and $10_2$ of the shielding foil 4 make electrical contact with one another.

In addition to the previously mentioned exemplary embodiments of an electrically conductive connection 12 between the metallic coatings $10_1$ and $10_2$ of the shielding foil 4, which can already be implemented on the prefabricated cable 1, the following text describes exemplary embodiments for an electrically conductive connection 12 with interaction between the prefabricated cable 1 and further components, in particular the outer-conductor contact element of the plug connector.

In the cable plug connector arrangement 100 according to the invention as per FIGS. 9A and 9B, the prefabricated cable 1 is inserted in the plug connector 19. The shielding foil 4 pushed back around the supporting sleeve 7 and the shielding mesh 4 likewise pushed back around the supporting sleeve 7 is pressed, in particular crimped, with the outer-conductor contact element 20 of the plug connector 19.

For better pushing back of the shielding foil 4 around the supporting sleeve 7 and the shielding mesh 5, at least one, preferably more, incisions are made in the shielding foil 4, as can be seen in FIGS. 9B and 9C, starting from the end face of the shielding foil 4 in the longitudinal axial direction of the prefabricated cable 1. The cutouts 21 formed as a result preferably have a cutout width of the same or a similar magnitude as the width of each strip 22 of the shielding foil 4 formed between two cutouts. As an alternative, however, only slot-like cutouts 21 are also conceivable.

By virtue of the pressing or crimping process, according to FIG. 9B, stranded-wire regions of the shielding mesh 5 respectively enter the cutouts 21 formed between the strips 22 of the shielding foil 4 and make contact with the regions of the outer-conductor contact element 20 that are located in the region of the cutouts 21. By virtue of the electrical contact-connection of the metallic coating $10_2$, formed on the inner lateral surface, of the pushed-back shielding foil 4 by the outer-conductor contact element 20 and the simultaneous electrical contact-connection of the metallic coating $10_1$, formed on the outer lateral surface, of the pushed-back shielding foil 4 by the shielding mesh 5, an electrically conductive connection 12 is thus formed between the metallic coatings $10_1$ and $10_2$ of the shielding foil 4. The shielding mesh 5 and the outer-conductor contact element 20 thus together form the electrically conductive connection 12 between the metallic coatings $10_1$ and $10_2$ of the shielding foil 4.

An additional contact-connection between the outer-conductor contact element 20 and the shielding mesh 5 is effected, in the case of a shielding mesh 5 which is axially elongated in relation to the shielding foil 4, additionally in the axially elongated region 23 of the shielding mesh 5, as indicated in FIG. 9A.

The electrically conductive connection 12 between the metallic coatings $10_1$ and $10_2$ of the shielding foil 4 by means of an electrical contact-connection between the outer-conductor contact element 20 and the pushed-back shielding mesh 5 can additionally be increased in that, in each individual strip 22 of the pushed-back shielding foil 4, at least one leadthrough 24, preferably multiple leadthroughs 24, and/or at least one recess 25, preferably multiple recesses 25, are formed at the edges of the individual strips 22 of the pushed-back shielding foil 4 according to FIG. 9C.

In a further exemplary embodiment of a cable plug connector arrangement 100 according to the invention as per FIGS. 10A and 10B, the strips 22 of the shielding foil 4 that are pushed back around the supporting sleeve 7 are folded on their end face in such a way that the longitudinal extent of the folded region 26 is oriented at an angle greater than 0° and less than 90°, preferably at an angle of 45°, in relation to the longitudinal extent of the non-folded region 27 of the individual strip 22.

In this way, both the metallic coating $10_1$, formed on the outer lateral surface of the shielding foil 4, of the non-folded region 27 of each strip 22 of the shielding foil 4 and the metallic coating $10_2$, formed on the inner lateral surface of the shielding foil 4, of the folded region 26 of each strip 22 of the shielding foil 4 is in electrical contact with the shielding mesh 5. The shielding mesh 5 thus forms the electrical connection between the metallic coatings $10_1$ and $10_2$ of the shielding foil 4.

In a further exemplary embodiment of the cable plug connector arrangement 100 according to the invention as per FIG. 11, the plug-side end 11 of the shielding foil 4 ends in a cavity 28, delimited by metal, within the plug connector 19. In the exemplary embodiment illustrated in FIG. 11, the metallic delimitation 29 of the cavity 28 can be formed in a region belonging to the outer-conductor contact element 20. It is essential that the metallic delimitation of the cavity 28, that is to say the metallic region of the outer-conductor contact element 20, makes electrical contact with each of the metallic coatings $10_1$ and $10_2$ of the shielding foil 4 and thus forms the electrically conductive connection 12. The end face of the shielding foil 4 does not necessarily have to touch the metallic delimitation of the cavity 28, as illustrated in FIG. 11, but instead may also be spaced apart from the metallic delimitation of the cavity 28 by air or a dielectric material or another electrically conductive material. For the formation of a cavity 28 delimited by metal, a further metallic element arranged in the plug connector 19 can also be used.

Lastly, an electrical plug connection 30 between a plug connector 19 and a corresponding mating plug connector 31 can be seen in FIG. 12. The inner conductor 2 of the prefabricated cable 1 is to this end connected to an inner-conductor contact element 32 of the plug connector 19, for example via a crimped or soldered connection. An insulating element 33 of the plug connector 19 is arranged between the outer-conductor contact element 20 and the inner-conductor contact element 32 for the purpose of mutual separation and electrical insulation. The outer-conductor contact element 20 of the plug connector 19 is inserted in a plug connector housing 34.

The mating plug connector 31 is equivalently connected to a prefabricated cable in a plug connector arrangement 200. An outer-conductor contact element 36 is arranged in a plug connector housing 35 of the mating plug connector 31. The outer-conductor contact element 36 of the mating plug connector 31 is electrically connected to the corresponding outer-conductor contact element 20 of the plug connector 19. An inner-conductor contact element 37 of the mating plug connector, which is electrically connected to the corresponding inner-conductor contact element 32 of the plug connector 19, is spaced apart and electrically insulated from the outer-conductor contact element 36 via an insulator element 38 of the mating plug connector 31. The plug connector housing 34 of the plug connector 19 is mechanically connected to the plug connector housing 35 of the mating plug connector 31 for example via a latching connection 39. The inner-conductor contact element 37 is connected to the inner conductor 40 of the prefabricated cable 41 inserted and fastened in the mating plug connector 31. In the prefabricated cable 41, the inner conductor 40 is enclosed by an insulator element 42, the insulator element 42 is enclosed by a shielding foil 43, the shielding foil 43 is enclosed by a shielding mesh 44, and the shielding mesh 44 is enclosed by a cable sheath 45. A supporting sleeve 46 is fastened to the shielding mesh 44 exposed by the cable sheath 45. The exposed shielding mesh 44 is pushed back around the supporting sleeve 46 and electrically connected to the outer-conductor contact element 36 by means of pressing or crimping.

The two metallic coatings of the shielding foils 4 and 43 of the two prefabricated cables 1 and 41, respectively, are each electrically connected to one another at their plug-side ends via a metallic connecting element 14 according to FIGS. 4A and 4B.

Instead of a cable plug connector, the mating plug connector 31 may alternatively also be in the form of an adapter, a circuit board plug connector or housing plug connector, or the like.

What is claimed is:

1. A prefabricated cable comprising:

a shielding foil, a shielding mesh which encloses the shielding foil, and a cable sheath which encloses the shielding mesh, wherein the cable sheath exposes the shielding mesh at a plug-side end of the prefabricated cable, wherein the shielding foil comprises a dielectric foil of a dielectric material and a respective metallic coating on an outer lateral surface and on an inner lateral surface of the dielectric foil, and wherein the metallic coating on the outer lateral surface is electrically conductively connected to the metallic coating on the inner lateral surface of the shielding foil via at least one electrically conductive connection, and wherein the at least one electrical connection in each case a) is guided through the dielectric foil in a plug-side axial end region of the shielding foil; and/or b) at least partially covers an end face of the dielectric foil at a plug-side axial end of the shielding foil.

2. The prefabricated cable as claimed in claim 1, wherein the at least one electrical connection is spaced apart from the plug-side axial end of the shielding foil.

3. The prefabricated cable as claimed in claim 2, wherein the at least one electrical connection is spaced apart from the plug-side axial end of the shielding foil by less than one quarter of the wavelength of an electromagnetic wave that is to be transmitted by the cable during operation of the cable.

4. The prefabricated cable as claimed in claim 1, wherein the at least one electrical connection covers the entire end face of the dielectric foil at the plug-side axial end of the shielding foil.

5. The prefabricated cable as claimed in claim 1, wherein the electrically conductive connection between the metallic coating on the outer lateral surface and the metallic coating on the inner lateral surface is formed in an associated leadthrough of the shielding foil.

6. The prefabricated cable as claimed in claim 1, wherein the electrically conductive connection between the metallic coating on the outer lateral surface and the metallic coating on the inner lateral surface is formed in each case in an associated recess designed to delimit the shielding foil or in each case adjoining the shielding foil or in each case spaced apart from the shielding foil.

7. The prefabricated cable as claimed in claim 1, wherein multiple electrically conductive connections are formed between the metallic coating on the outer lateral surface and the metallic coating on the inner lateral surface.

8. The prefabricated cable as claimed in claim 7, wherein the multiple electrically conductive connections are preferably arranged in equidistant angular segments in relation to one another.

9. The prefabricated cable as claimed in claim 1, wherein the shielding foil, in at least one punctiform or areal region, is processed in each case such that the dielectric foil is displaced in each punctiform or areal region and the metallic coatings on the outer lateral surface and on the inner lateral surface of the shielding foil make electrical contact in each case.

10. The prefabricated cable as claimed in claim 1, wherein the metallic coating on the outer lateral surface and the metallic coating on the inner lateral surface are electrically connected to one another via the electrically conductive connection in such a way that a region between the metallic coatings is completely filled with metal.

11. The prefabricated cable as claimed in claim 1, wherein the exposed shielding mesh is enclosed by a supporting sleeve, wherein the exposed shielding mesh and the shielding foil are pushed back around the supporting sleeve, wherein the pushed-back shielding mesh has at least one region which is exposed by the pushed-back shielding foil in each case.

12. The prefabricated cable as claimed in claim 11, wherein multiple cutouts, which each extend parallel to one another in a longitudinal axial direction of the prefabricated cable, are formed in the pushed-back shielding foil starting from an end face of the pushed-back shielding foil, wherein a respective strip of the pushed-back shielding foil is formed between two mutually adjacently formed cutouts.

13. The prefabricated cable as claimed in claim 12, wherein each strip is respectively folded in such a way that at least a subregion of a folded region of the strip makes electrical contact with the shielding mesh.

14. A cable plug connector arrangement, comprising:

a prefabricated cable as claimed in claim 1, and a plug connector which is connected to the prefabricated cable at the plug-side end of the prefabricated cable, wherein the plug connector contains at least one outer-conductor contact element, wherein the outer-conductor contact element is electrically connected to the shielding mesh and/or to the shielding foil.

15. The cable plug connector arrangement as claimed in claim 14, wherein the shielding foil exposes the shielding mesh at least in one region in each case, wherein the metallic coating on the outer lateral surface and the metallic coating on the inner lateral surface of the shielding foil are electrically connected via an areal electrical connection between a surface of the shielding foil and a surface of at least one region of the shielding mesh that is exposed by the shielding foil.

16. The cable plug connector arrangement as claimed in claim 15, wherein the areal electrical connection is formed by means of the outer-conductor contact element or a further metallic element in the plug connector that in each case rests areally on the surface of the exposed shielding mesh and on the surface of the shielding foil.

17. The cable plug connector arrangement as claimed in claim 14, wherein the outer-conductor contact element or a further metallic element in the plug connector has a respective sharp-edged and/or pointed surface structure which in each case passes through the shielding foil between the metallic coating on the outer lateral surface and the metallic coating on the inner lateral surface.

18. The cable plug connector arrangement as claimed in claim 14, wherein the plug-side end region of the shielding foil ends in a cavity of the plug connector that is preferably completely delimited by metal, wherein the electrically conductive connection between the metallic coating on the outer lateral surface and the metallic coating on the inner lateral surface is formed by the metallic delimitation of the cavity.

19. An electrical plug connection, comprising a cable plug connector arrangement as claimed in claim 14 and a corresponding mating plug connector, wherein the plug connector and the mating plug connector are respectively electrically connected to one another on the inner-conductor side and outer-conductor side.

* * * * *